June 18, 1929.                D. J. CAMPBELL                1,717,914
                                  MOLDING
                            Filed Oct. 25, 1926        13 Sheets-Sheet 1

Inventor
Donald J. Campbell
By Frank E. Liverance Jr.
Attorney

June 18, 1929.          D. J. CAMPBELL          1,717,914
                            MOLDING
                  Filed Oct. 25, 1926      13 Sheets-Sheet 2

Inventor
Donald J. Campbell
By Frank E. Liverance, Jr.
Attorney.

June 18, 1929.                D. J. CAMPBELL                1,717,914
                                 MOLDING
                        Filed Oct. 25, 1926        13 Sheets-Sheet 6

Inventor
Donald J. Campbell
By Frank E. Liverance, Jr.
Attorney.

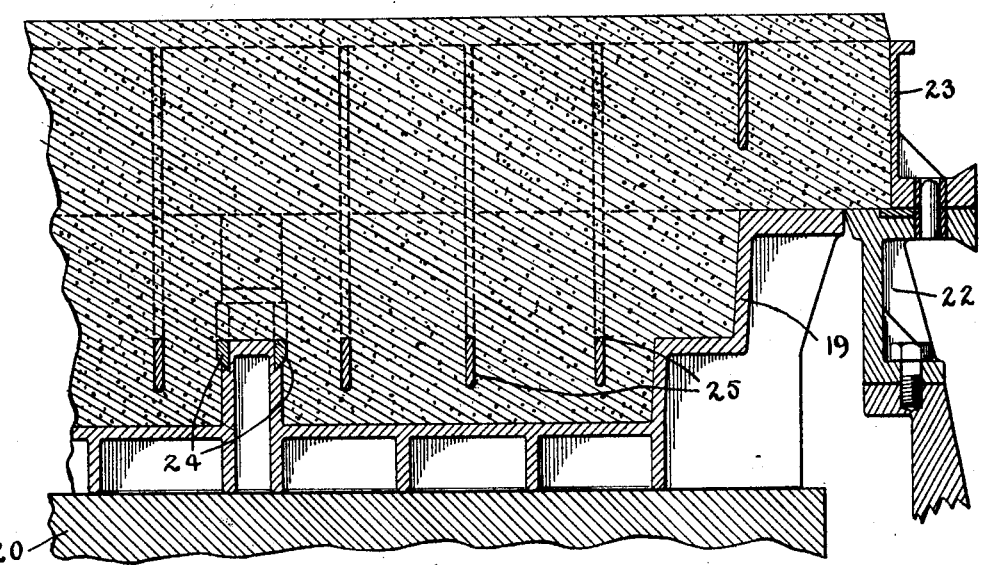
Fig. 14.
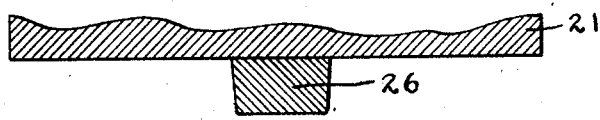
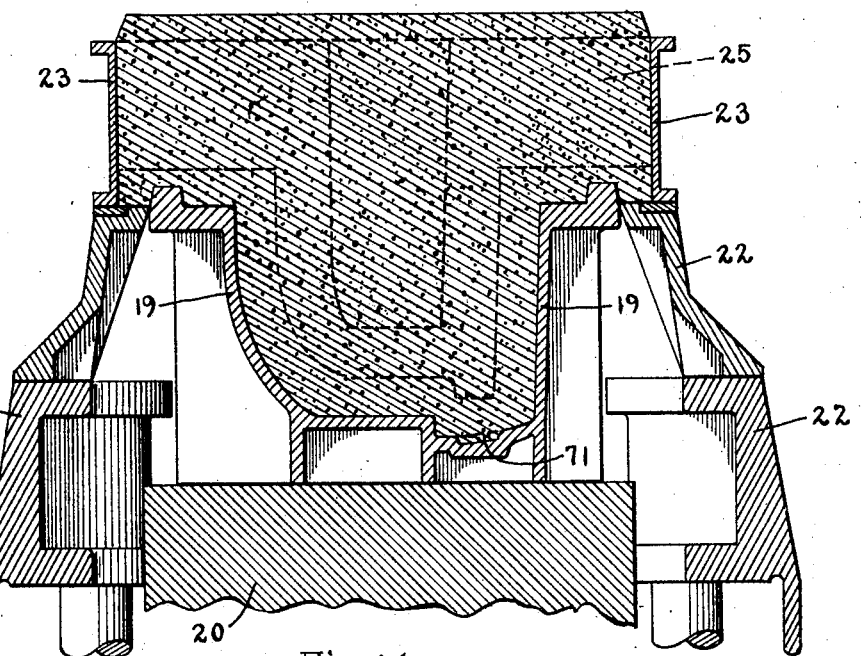
Fig. 15.

June 18, 1929. D. J. CAMPBELL 1,717,914
MOLDING
Filed Oct. 25, 1926  13 Sheets-Sheet 11

Inventor
Donald J. Campbell
By Frank E. Liverance, Jr.
Attorney.

June 18, 1929.  D. J. CAMPBELL  1,717,914
MOLDING
Filed Oct. 25, 1926   13 Sheets-Sheet 12

Inventor
Donald J. Campbell
By Frank E. Liverance Jr.
Attorney.

June 18, 1929.                D. J. CAMPBELL                1,717,914
                                  MOLDING
                         Filed Oct. 25, 1926      13 Sheets-Sheet 13

Inventor
Donald J. Campbell
By Frank E. Liverance Jr
Attorney.

Patented June 18, 1929.

1,717,914

UNITED STATES PATENT OFFICE.

DONALD J. CAMPBELL, MUSKEGON HEIGHTS, MICHIGAN.

MOLDING.

Application filed October 25, 1926. Serial No. 143,917.

This invention relates to improvements in the method and apparatus for making molds for castings and particularly for cored castings such as cylinder block castings for internal combustion engines and the like.

In the following description the invention is described as applied to a casting for a water jacketed multiple cylinder block which includes valve chambers, valve tappet chambers, inlet and exhaust passages and the upper portion of the crank case of the engine all formed as an integral casting. The making of the mold for a casting of this description is a typical example of the utilization of this invention but it is to be understood that the invention may also be employed in making molds for castings of other descriptions.

The so called cylinder block casting of a modern multiple cylinder water jacketed internal combustion engine is one of the most complicated in common commercial use and it has heretofore been the common practice in making the mold for such a casting to utilize a great many so called dry sand cores. In the vernacular of the foundry a mold may be composed partly of "green sand" and partly of "dry sand cores". The green sand is the ordinary molders' sand which is pressed or tamped in a flask around the pattern and retains its shape by the natural tendency of molding sand particles to cling together and this type of mold must be handled carefully and has no great strength. The dry sand cores are formed of a different kind of sand usually mixed with linseed oil and some other ingredients and first molded to shape in a form called a core box after which they must be baked and they may then be readily handled and placed in the green sand mold in their proper locations.

Where a casting is of such shape that its mold may be wholly or largely formed of green sand the molding is comparatively simple and inexpensive but where the mold necessitates the large use of dry sand cores the expense is largely increased. The reason for this is that in the first place the forming of a green sand mold is much more simple than that of a dry sand core. It constitutes only the one act of compressing the sand in the flask around the pattern. While in the manufacture of the dry sand core the materials must first be mixed and then molded in a separate core box after which they must be baked in an oven and then properly located in the mold. Furthermore the green sand may be used over and over with little loss or expense while it is not practical to use the dry sand core more than once, it being customary to discard the dry sand core after the casting has been made and provided new core sand which in itself is of considerable expense and the ingredients which are mixed with it are also expensive when considered on a basis of large production.

The principal object of this invention is to provide means for dispensing to a large extent with dry sand cores, replacing those parts of the mold with forms of green sand. Another object of the invention is to provide a most convenient and economical method and apparatus for forming the different parts of the mold of green sand. The invention also provides various means for strengthening and supporting the green sand portions of the mold in such a way that the green sand may be used where heretofore it has been considered necessary to use dry sand cores. Various other novel features pertaining to the formation of the mold and the apparatus therefor are also included in the invention as are hereinafter more fully described and particularly pointed out in the claims, reference being had to the accompanying drawing in which:

Fig. 14 is a fragmentary longitudinal section through the pattern for forming the drag portion of the mold showing the drag flask and parts of a molding machine in position.

Fig. 15 is a transverse sectional elevation of the same.

Like reference characters refer to like parts in the different figures of the drawings.

Figure 1:
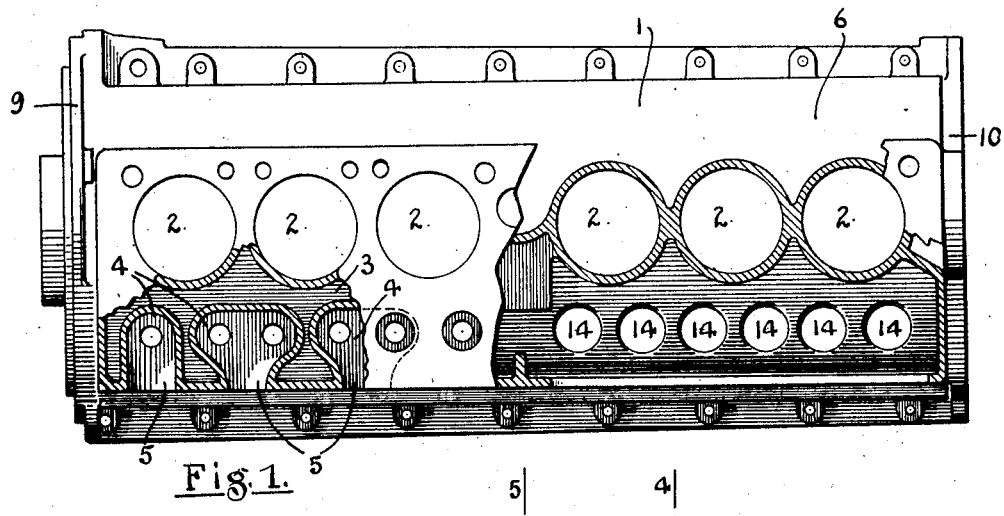
Fig. 1 is a plan view of a cylinder block casting, with parts broken away, such as may be cast in a mold formed by means of this invention.
Figure 2:
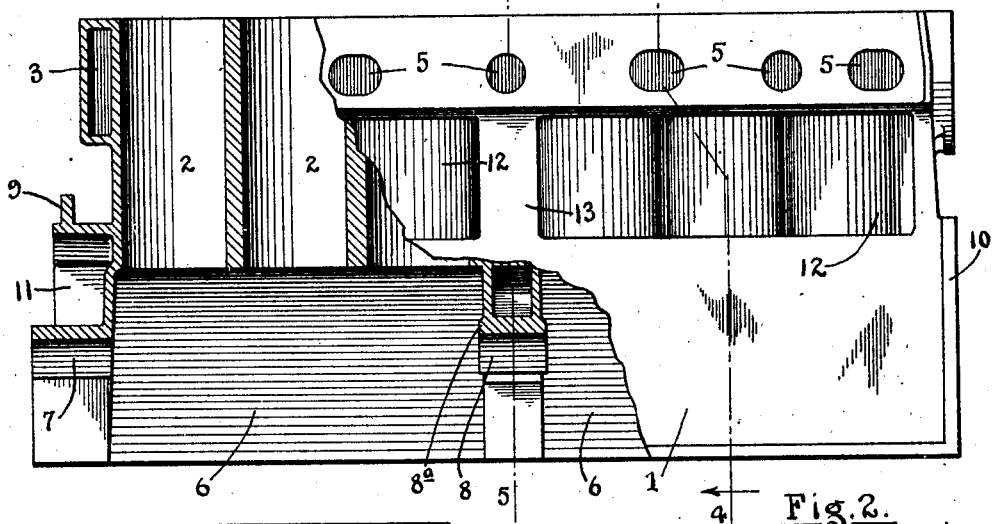
Fig. 2 is a side elevation of the same with a portion broken away.
Figure 3:
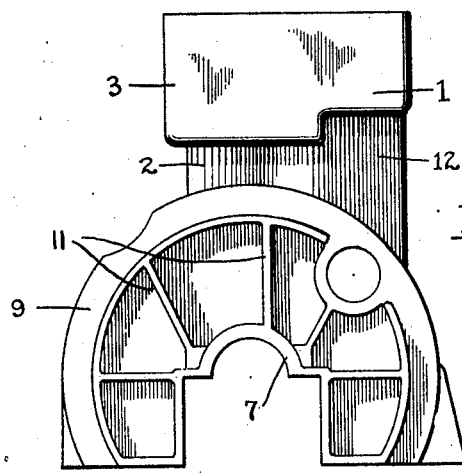
Fig. 3 is an elevation of one end of the casting.
Figure 4:
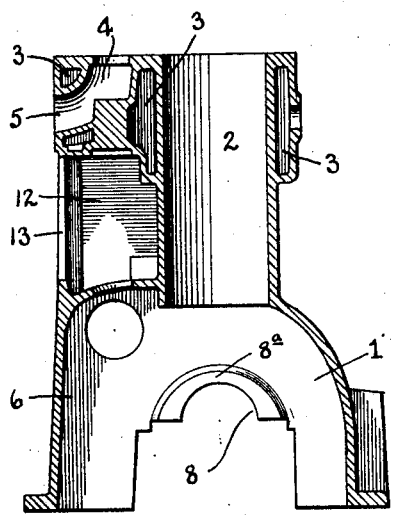
Fig. 4 is a transverse sectional elevation sustantially on the line 4—4 of Fig. 2.
Figure 5:
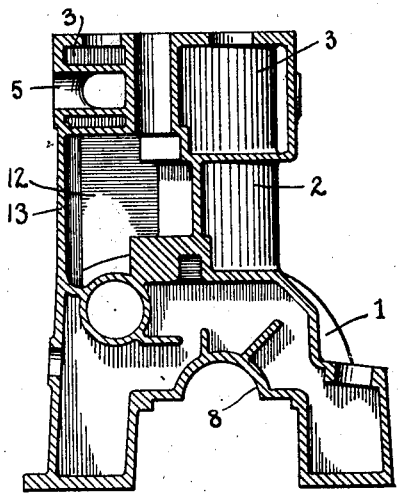
Fig. 5 is a transverse sectional elevation on the line 5—5 of Fig. 2.

1 represents the casting shown in the accompanying drawings as an example of the piece to be cast by use of this invention. This casting has six cylinders 2 open at top and bottom and surrounded at their upper portions by a water jacket 3. Valve chambers 4 for the inlet and exhaust valves are also provided and passages 5 communicates with these chambers. The valve chambers and passages are surrounded as much as possible by the said water jacket 3. The casting includes the upper part of the crank case 6 which is substantially semi-cylindrical in shape and bearing supports 7 are provided at each end of the casting and a central bearing support 8 is also provided. The central bearing support 8 is cored hollow for lightness and the ends of the casting have flanges 9 and 10 to which other parts of the engine are attached. These ends are strengthened by webs such as shown at 11. A valve tappet chamber 12 is provided at one side of the casting beneath the valve chambers, this chamber extending substantially the entire length of the casting and opening at one side thereof, this opening being divided by a dividing rail 13. The bottom of the valve tappet chamber has a plurality of holes 14 extending through into the crank case through which the valve tappets of the engine pass. As previously stated this casting providing all of the ports, chambers, passages, etc. is cast integrally.

The mold for the casting comprises essentially the drag 15, the cheek 16, the cope 17 and the tappet chamber mold 18.

Figure 8:
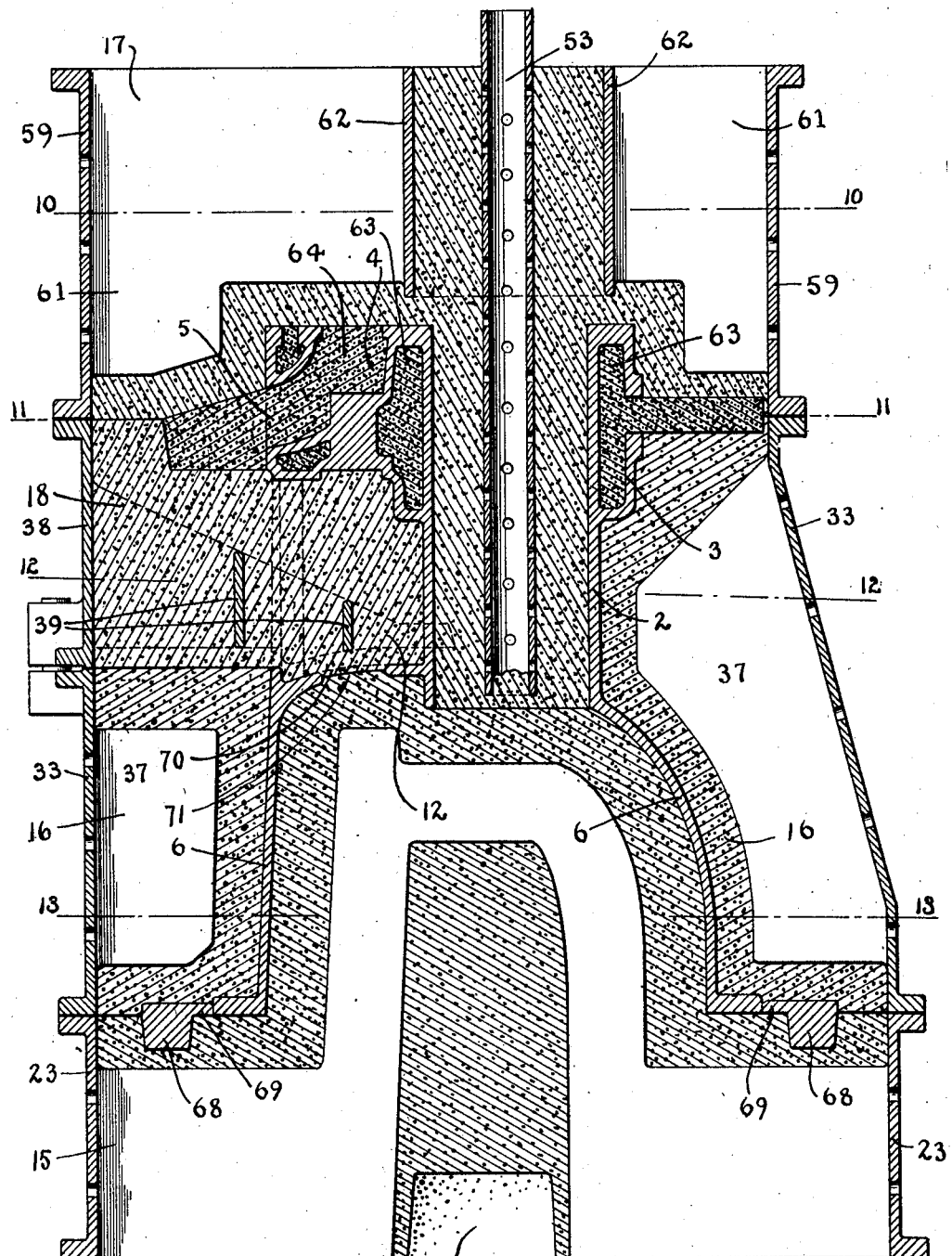
Fig. 8 is a transverse sectional elevation of the complete mold with the metal cast therein.
Figure 9:
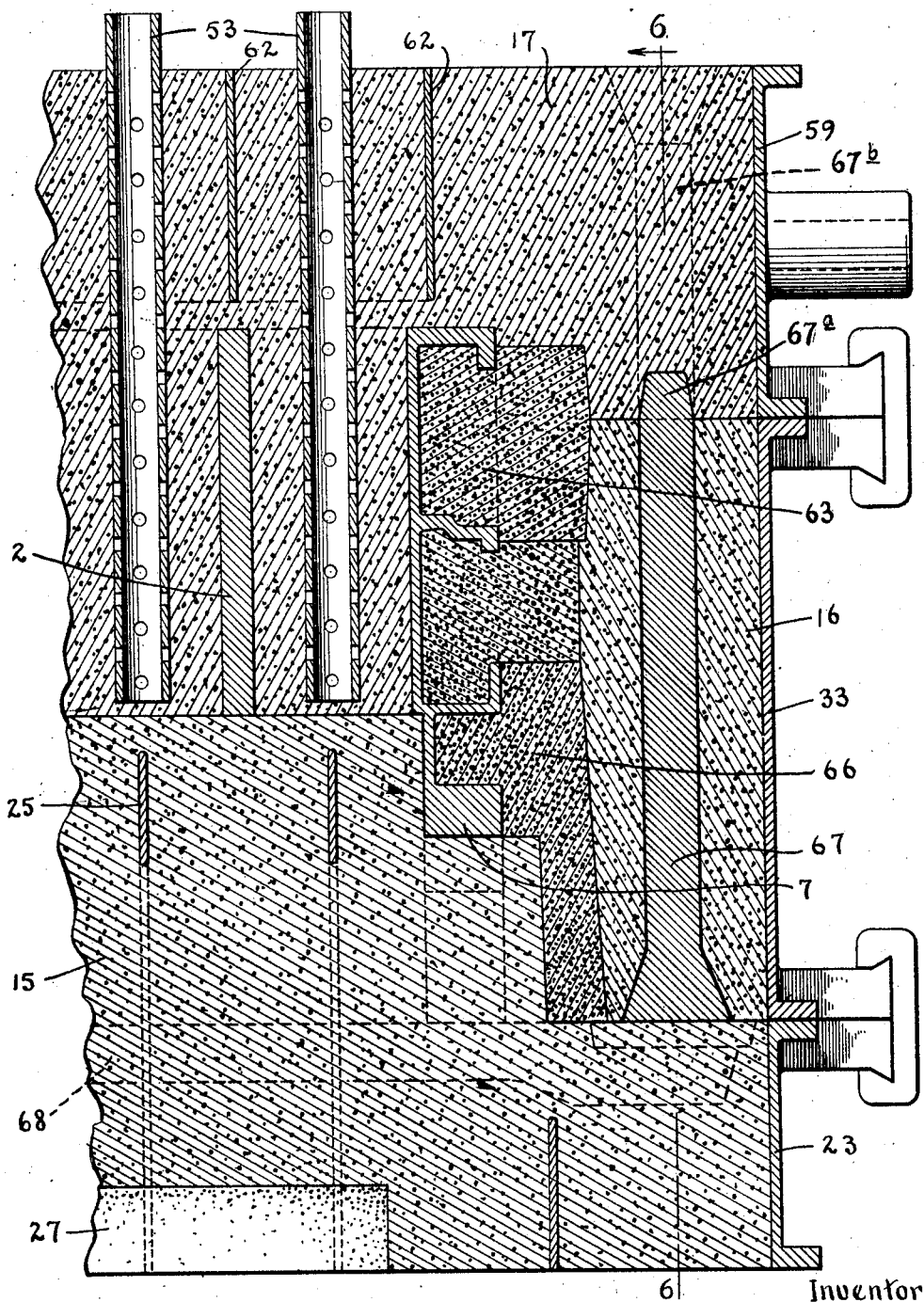
Fig. 9 is a fragmentary longitudinal sectional elevation of the same.
Figure 10:
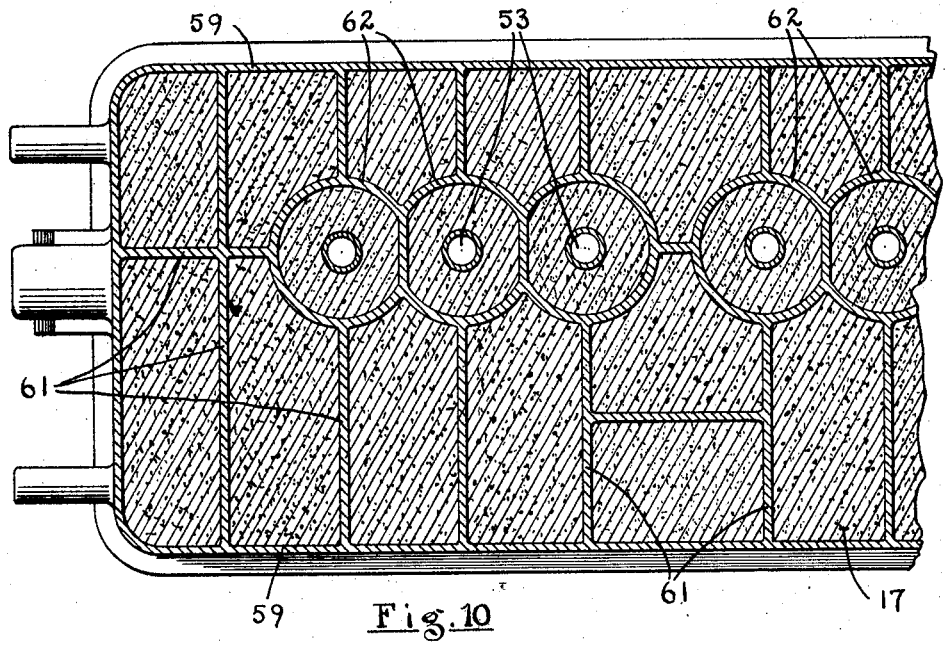
Fig. 10 is a horizontal section of one end of the mold on the line 10—10 of Fig. 8.
Figure 11:
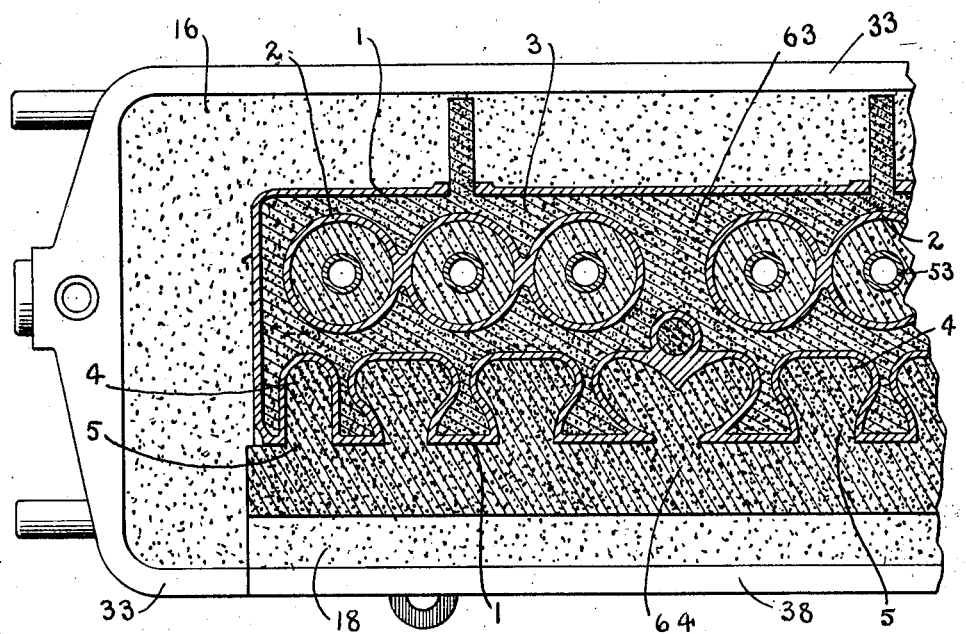
Fig. 11 is a horizontal section of one end of the mold on the line 11—11 of Fig. 8.
Figure 12:
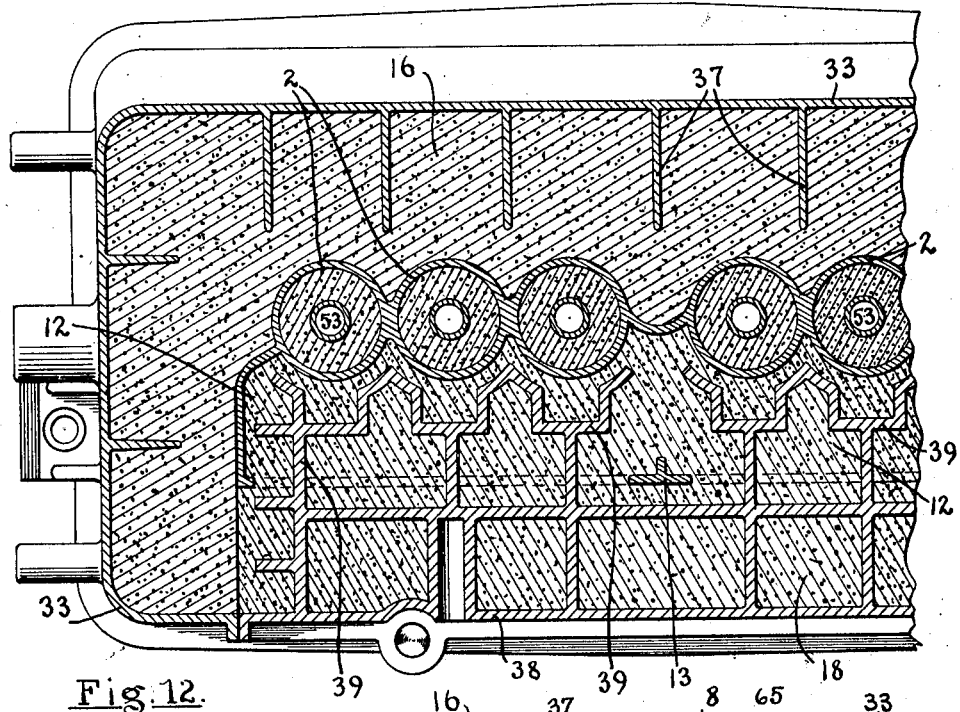
Fig. 12 is a horizontal section of one end of the mold on the line 12—12 of Fig. 8.
Figure 13:
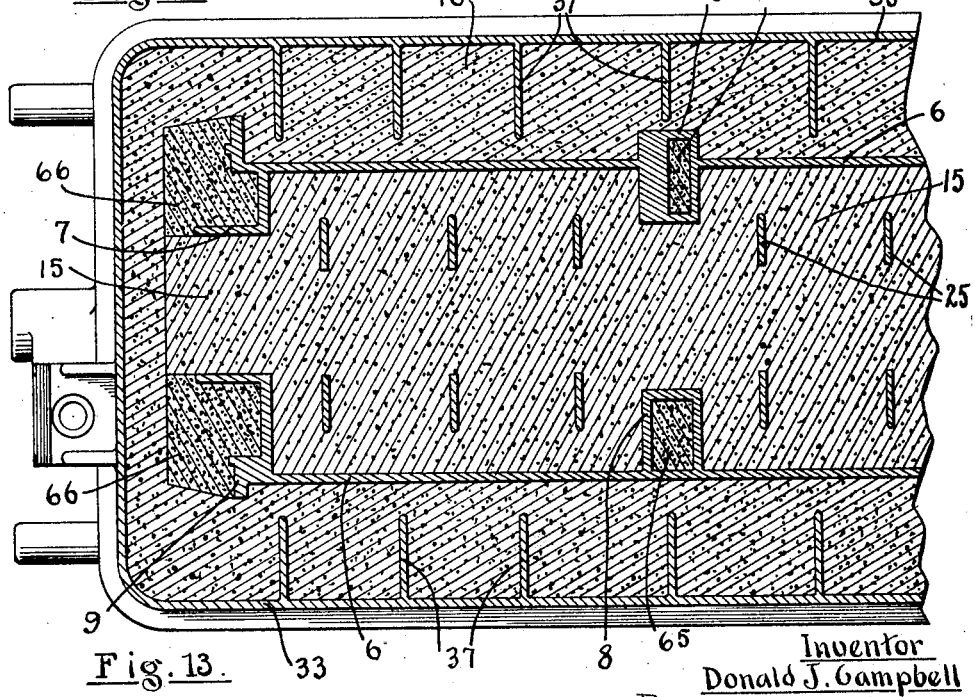
Fig. 13 is a horizontal section of one end of the mold on the line 13—13 of Fig. 8.
Figure 16:
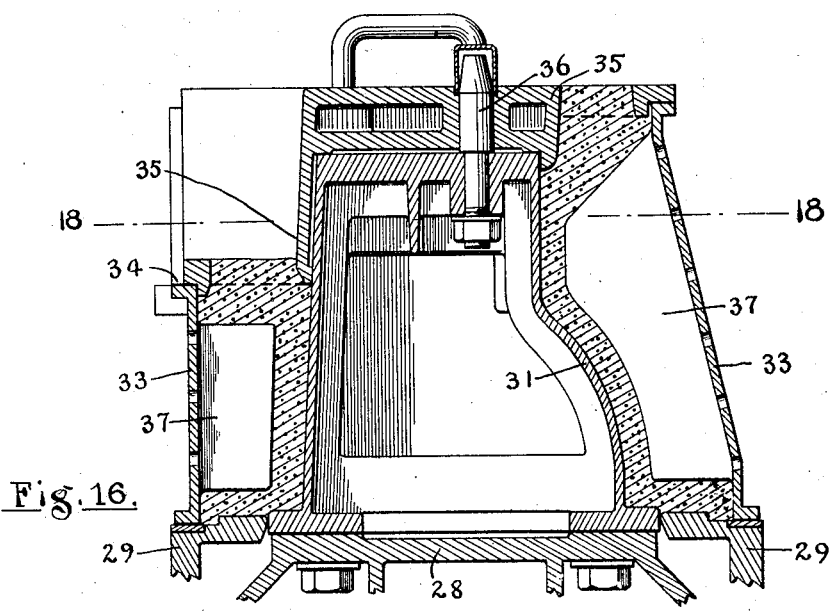
Fig. 16 is a transverse sectional elevation of the cheek portion of the mold in its first stages of formation and includes parts of the apparatus used therefor.
Figure 17:
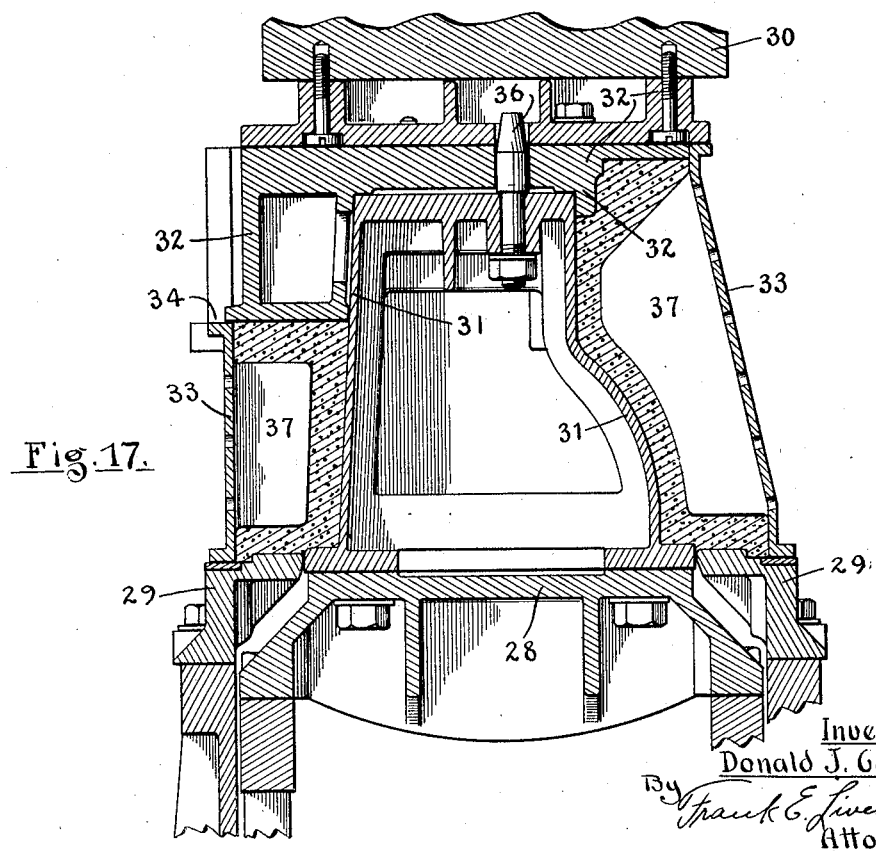
Fig. 17 shows the same at the completion of its formation with parts of the apparatus used.
Figure 18:
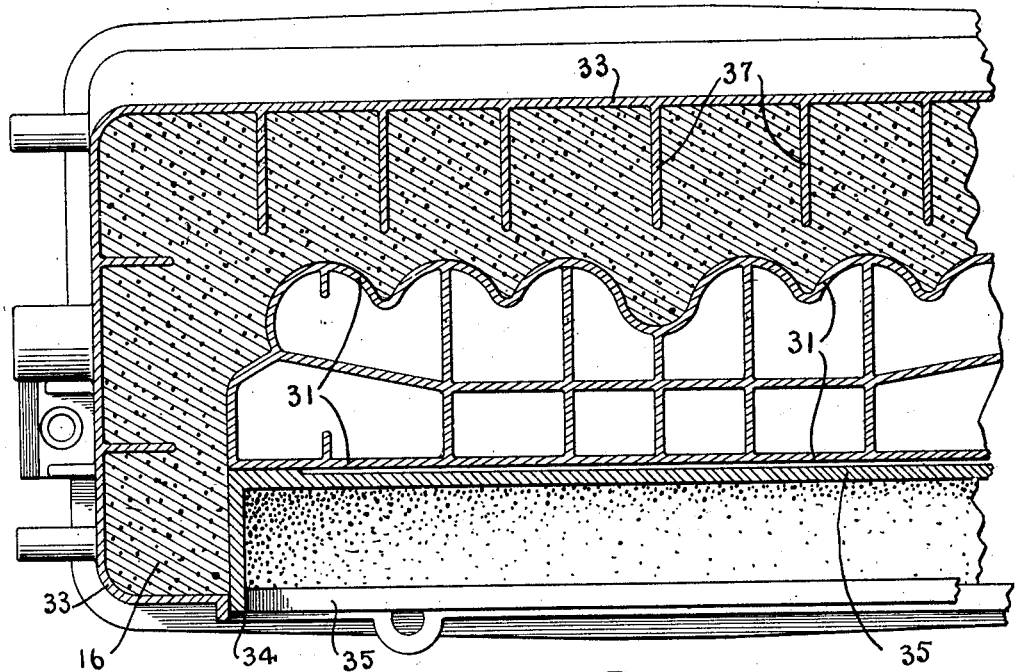
Fig. 18 is a horizontal section of one end of the mold and apparatus as shown in Fig. 16 on the line 18—18 of Fig. 16.
Figure 20:
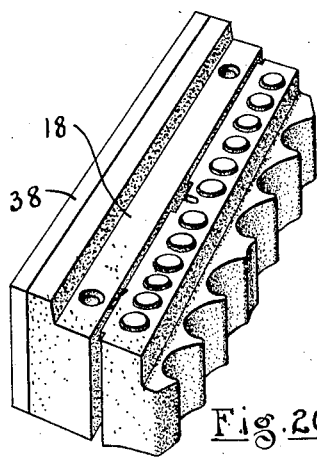
Fig. 20 is a perspective view of the green sand tappet chamber core.
Figure 19:
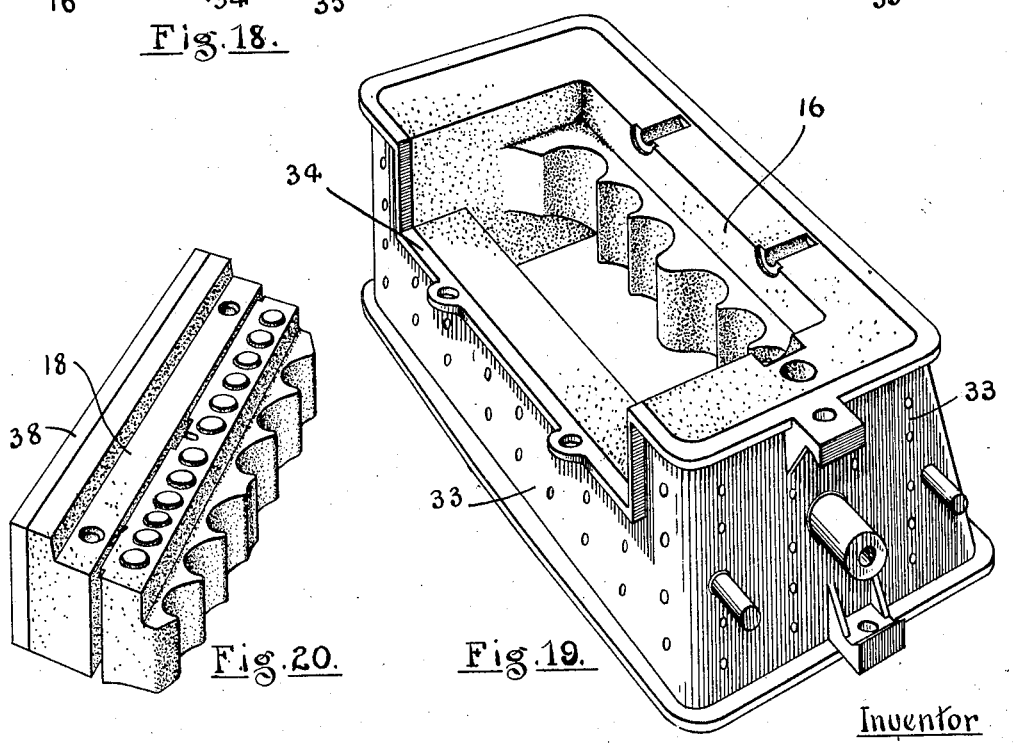
Fig. 19 is a perspective view of the completed cheek portion of the mold.

The drag pattern 19 for forming the drag mold is preferably mounted on a molding machine of suitable type which includes a squeezing member 20, a pressure head 21 and a stripping table 22, as shown in Figs. 14 and 15. This part of the mold is formed upside down, the drag flask 23 being supported by the stripping table during the operation. With the flask in position over the pattern the pattern and flask are filled with sand and jolted in the usual way and the squeezing member 20 and stripping table 22 are then raised in unison against the pressure head 21 to compress the sand in the mold and flask, after which the squeezing member 20 carrying the pattern is lowered during vibration of the mold while the stripping table remains stationary to separate the pattern from the mold and the completed drag portion of the mold is then inverted and placed in position as shown in Fig. 8.

The drag pattern makes the impression for the center bearing support 8 and this bearing support has extensions 8ᵃ which must be provided for in the pattern as follows: The substantially semi-circular loose pieces 24 are laid in the pattern and the sand is molded around them and when the pattern is withdrawn these loose pieces separate from the pattern and remain in the sand until the pattern has moved away from them whereat they will move inwardly and drop from the mold through the imprint made by the pattern. The flask 23 is provided with integrally formed webs 25 extending into the sand to strengthen and support it, these webs being so shaped that they are completely surrounded by the sand and cannot contact with the metal of the casting when it is poured into the mold. As the mold is much deeper in its center portion than at the edges a block 26 is attached to the surface of the pressure head 21 to imprint the sand at the deep portion of the mold to insure its proper packing and the webs 25 are cut away at the center to receive the block 26. The block 26 makes the imprint 27 in the under surface of the mold which interferes in no way with the casting.

Figure 6:
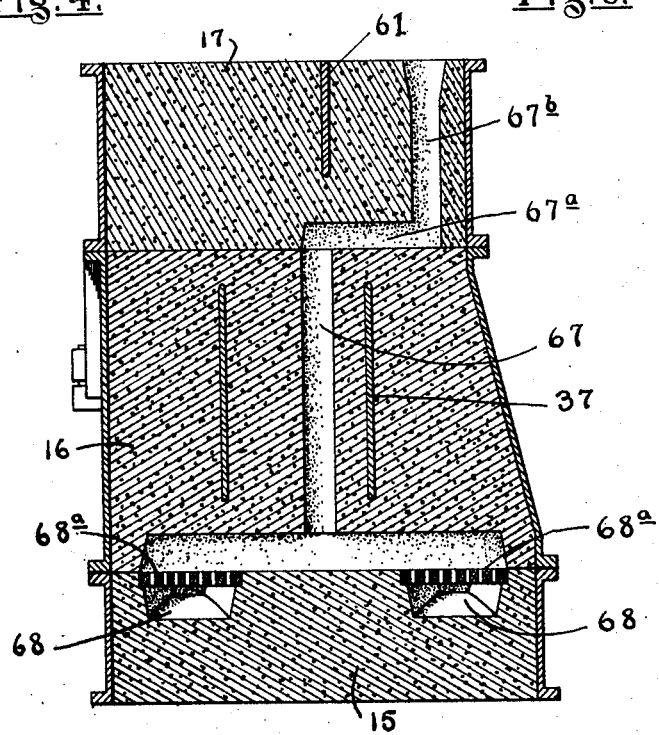
Fig. 6 is a transverse sectional elevation on line 6—6 of Fig. 9 showing the riser and branch thereof used for pouring.
Figure 7:
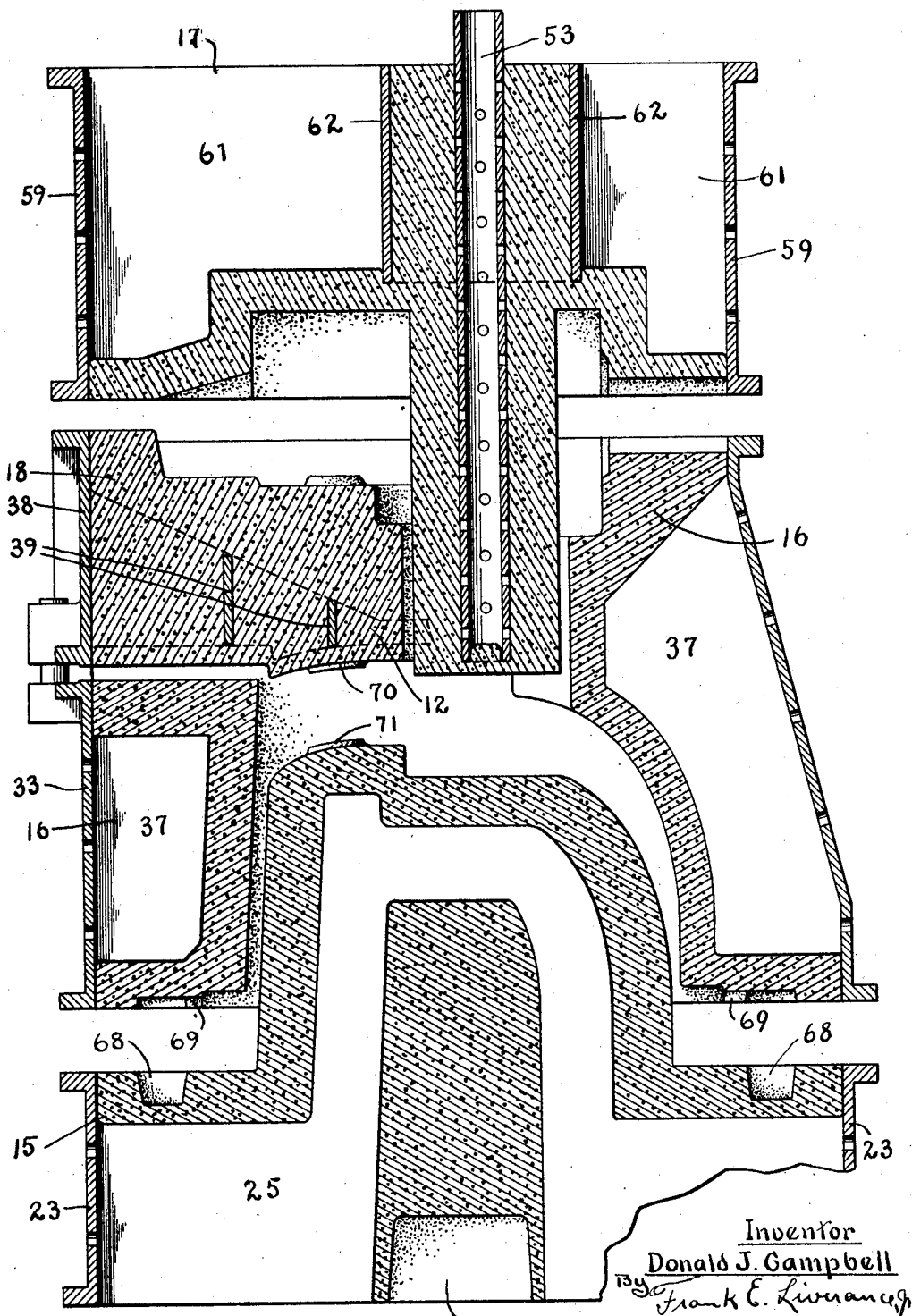
Fig. 7 is a transverse sectional elevation of the various parts of the green sand mold shown in partially separated position.

The cheek mold forms that part of the pattern which molds the outside of the casting from the base to the approximate center of the water jackets, being cut away at its front portion for the reception of the tappet chamber mold. This cheek mold is preferably formed by use of a molding machine having a squeezing member 28, a stripping table 29 and pressure head 30 and the pattern comprises two portions, the lower portion 31 of which is mounted on the squeezing member 28 and the upper portion 32 is attached to the pressure head 30. The flask 33 for this mold has a recess 34 in its front wall for the reception of the tappet chamber mold. In making this mold the flask 33 is supported upon the stripping table 29 and a so-called dummy 35 is placed over the flask, this dummy covering the top of the lower portion of the pattern 31 and also extending down into the recess 35 of the flask. The dummy is guided to proper position by the guide pins 36 on the lower portion of the pattern. Sand is deposited in the flask around the pattern through openings in the top of the dummy and is then jolted in place after which the superfluous sand is scraped off from the top of the dummy and the dummy removed and the squeezing member and stripping table are raised in unison against the pressure head 30 to which is attached the upper portion of the pattern 32 and the same is pressed tightly in the mold around the pattern. The upper portion of the pattern 32 forms the recess in the mold for the reception of a tappet chamber mold and also the imprint for the lower part of the water jacket. After the squeezing operation the squeezing member 28 and stripping table 29 are lowered to separate the two parts of the pattern, and remove the upper part from the mold and the squeezing member 28 carrying the lower part of the pattern is then lowered while the stripping table 29 is held stationary withdrawing the lower part of the pattern from the mold. The mold is then removed and placed upon the drag mold, as shown in Fig. 6. The flask 33 is provided with webs 37 which extend into the sand to aid in holding it in place.

Figure 23:
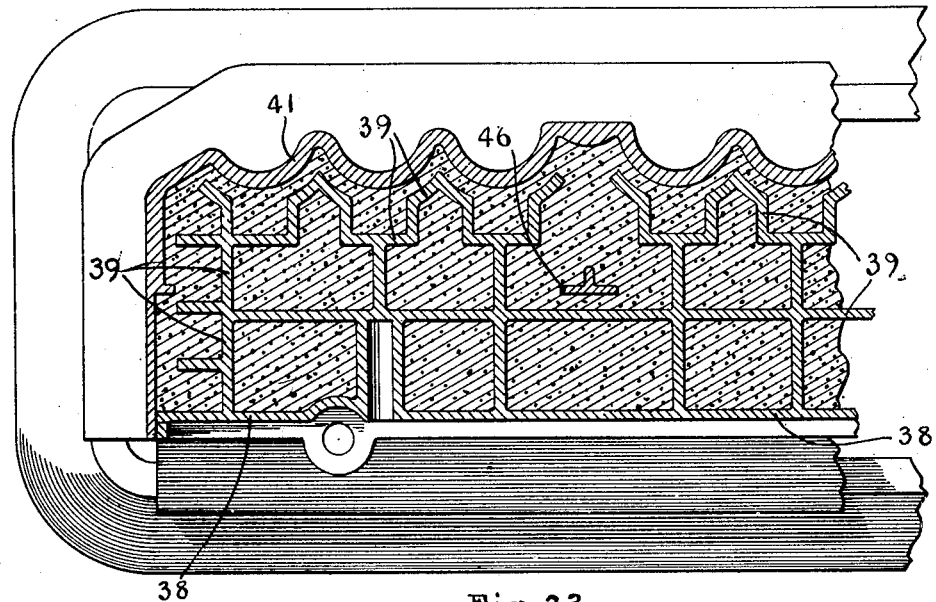
Fig. 23 is a horizontal section of one end of the same on the line 23—23 of Fig. 22.
Figures 21, 22:
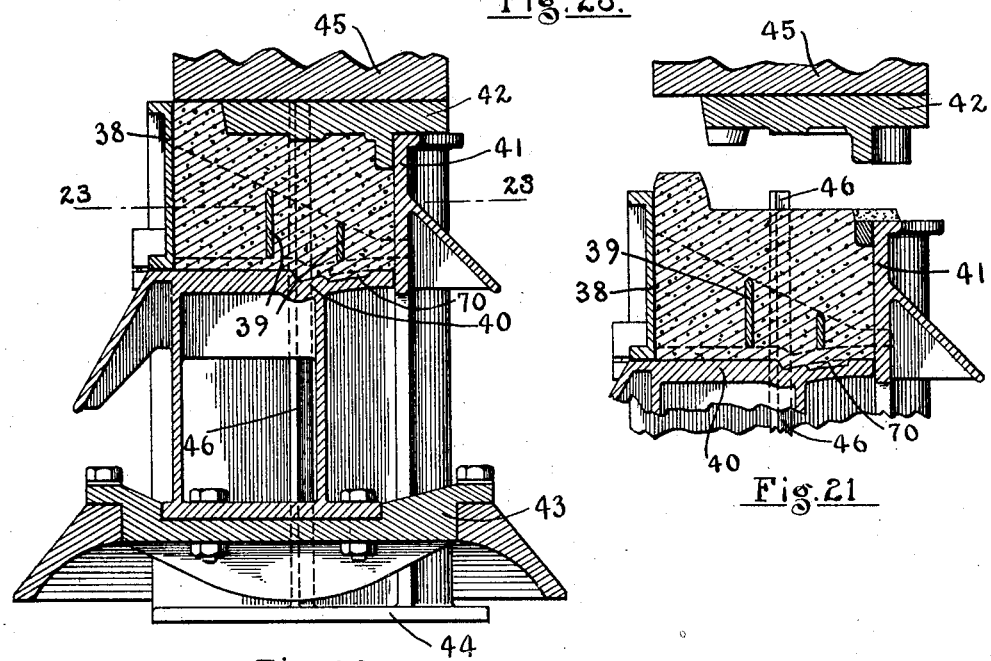
Fig. 21 is a transverse section of the pattern and other apparatus used for forming the tappet chamber core shown in the first stages of formation.
Fig. 22 is the same at the completion of the operation.
Figure 24:
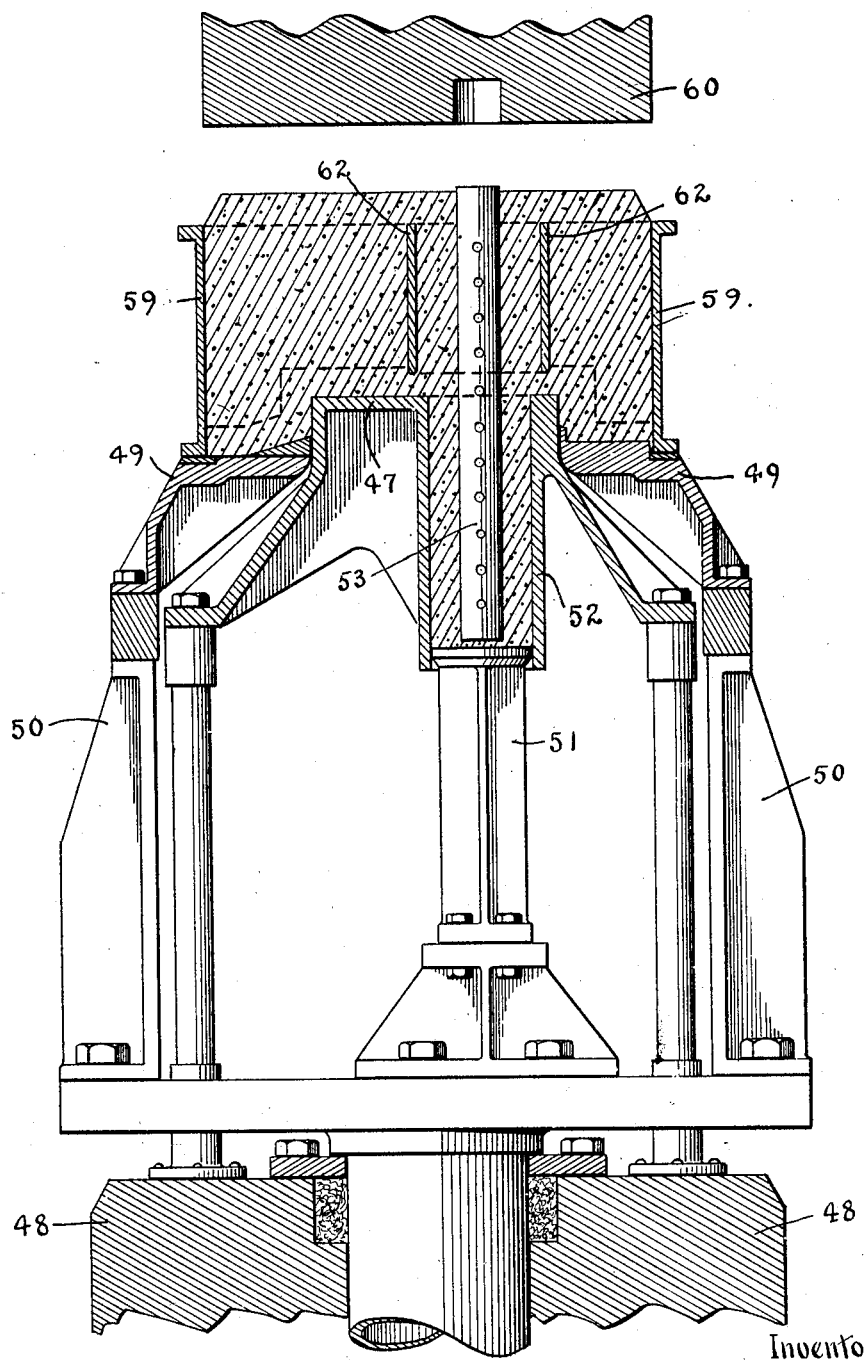
Fig. 24 is a transverse sectional elevation of the pattern and apparatus for forming the cope portion of the mold before the sand has been squeezed.
Figure 25:
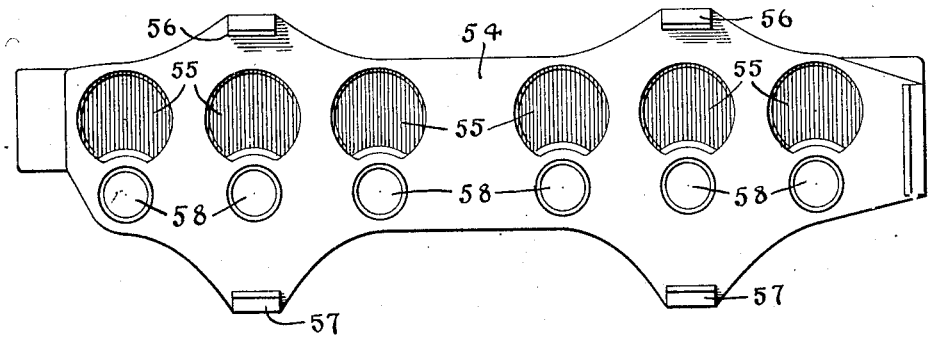
Fig. 25 is an inverted plan view of the cylinder barrel filling and vent pipe locating gauge which is a part of the apparatus used with this invention.
Figure 26:
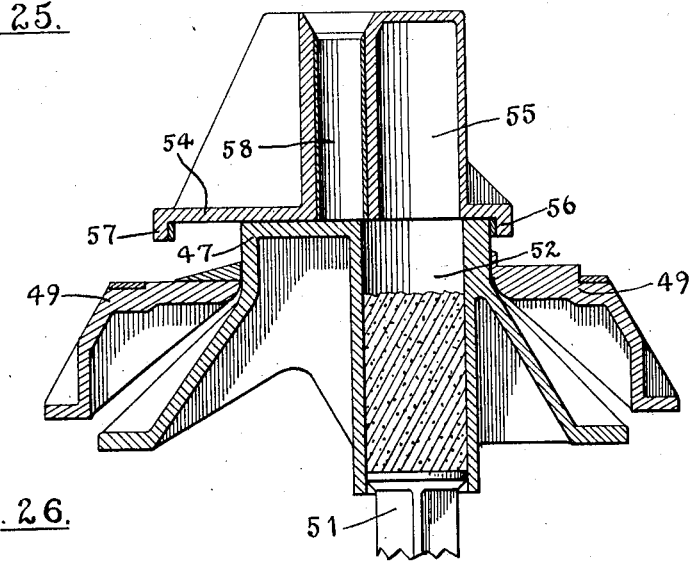
Fig. 26 is a transverse sectional elevation of the said gauge in use to fill the cylinder barrels of the pattern.
Figure 27:
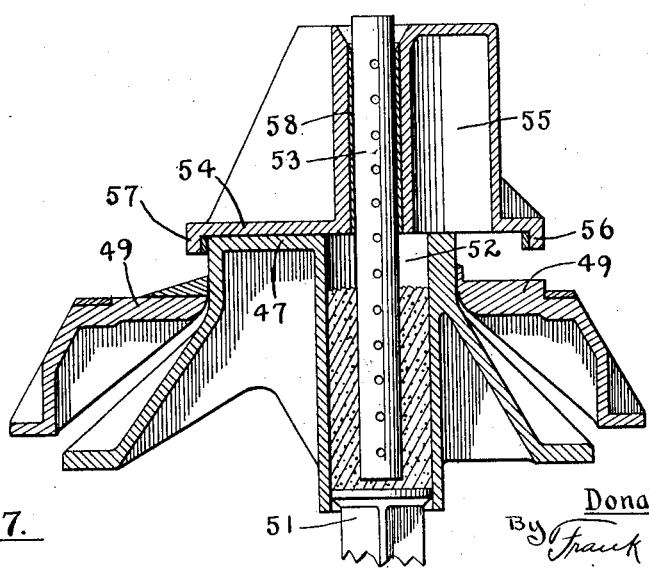
Fig. 27 is the same showing the gauge in position to guide the vent pipes.

The tappet chamber mold is formed about a so-called arbor which has a vertical face 38 the proper size to fill in the aperture 34 in the front side of the cheek flask. From the rear of this plate 38 a structure of supporting members 39 extends, about which the sand is pressed to form the mold. This supporting structure is so shaped that it will be wholly covered by the sand of the mold and not be contacted by the metal of the casting. This mold is preferably formed by use of a molding machine as shown in Figs. 21, 22 and 23, the pattern comprising a bottom portion 40, the vertical portion 41 and the top portion 42. The bottom 40 of the pattern is supported by the squeezing member 43 of the machine, the vertical portion 41 is carried by the stripping table 44 of the machine and the top portion 42 is mounted on the squeezing head 45. In addition to these members a prong 46 fixed to the stripping table 44 extends upward through the bottom portion 40 of the pattern and forms an opening through the mold into which the molten iron runs in casting to form the dividing strip 13 in the center of the opening of the tappet chamber.

In forming this portion of the mold the arbor is supported upon the lower portion 40 of the pattern and the sand is deposited within the pattern and jolted and scraped off, as shown in Fig. 21. The sand is then squeezed by the head 45 which also carries the upper portion 42 of the pattern, as shown in Fig. 22. The mold is then drawn away from the head 45 and the stripping table 44 is lowered to draw the vertical portion 41 of the pattern and also the prong 46 away from the sand after which the arbor with the sand molded around it is withdrawn and placed in position, as shown in Fig. 8.

The cope mold is formed as shown in Figs. 24, 25, 26 and 27 by the aid of a molding machine of suitable type. The cope mold forms the upper part of the casting above the substantial center of the water jackets and also has the downwardly extending barrel cores which mold the cylinders of the casting, these barrel cores being formed integrally with the cope mold of green sand. The pattern for the cope mold comprises the central portion 47 which is mounted on the stripping table 48 of the molding machine and the outer portion 49 which is mounted on the squeezing member 50 of the molding machine. The plungers 51 which close the lower ends of the barrel portions of the pattern are mounted on the squeezing member 50. The first operation in forming this mold is the filling of the barrels 52 with sand and then locating the vent pipes 53 therein.

A filling measure and centering gauge 54 is utilized for this part of the operation, this device comprising a plate having six measuring cups 55 to correspond with the numbers of barrels to be filled with sand. The plate is also provided with stop gauges 56 and 57 which engage the pattern and properly locate it thereon. The device is also provided with properly positioned guide holes 58 through which the vent pipes are inserted. In using this device the measuring cups 55 are first filled with sand and they are then inverted over the barrels 52 of the pattern and the plate of the device is laid upon the top surface of the pattern and the guide stops 56 are brought into engagement with one edge of the pattern. In this position the sand in the cups 50 is deposited in the barrels and the device is then moved until the stops 57 engage the opposite side of the pattern which properly locates the holes 58 over the barrels so that the vent pipes 53 may be inserted therethrough and imbedded in the sand to properly position them in the center of the respective barrels.

The measuring and centering device is then removed and the flask 59 is located upon the pattern and filled with sand and jolted and the sand is then squeezed by bringing the flask and pattern upward toward the squeezing head 60. The pattern is removed from the mold by lowering the stripping table 48 which lowers the center part of the pattern, the plungers 51 remaining stationary to support the barrel cores during this stripping operation. After the center portion 47 of the pattern has been thus removed from the sand the cope mold with the depending barrel cores is placed in position over the cheek mold and tappet chamber mold, as shown in Fig. 8. The cope mold also is provided with a structure of webs 61 and cylindrical members 62 imbedded in the sand and wholly surrounded thereby to support the sand in place in the flask.

The water jacket core 63 and the cores for the valve chambers and passages 64 must be made of dry sand, their shape and location being such that it is impossible to form and support them if made of green sand. These dry sand cores are located upon the cheek and tappet chamber molds before placing the cope mold.

The hollow portion of the center bearing support 8 is formed by a dry sand core 65 located and supported in the usual way and the ends of the casting around the bearing supports 7 are also formed by dry sand cores 66, the core prints therefor having been formed in the cheek mold. A riser 67 which extends vertically through the sand at one end of the cheek mold is branched at its lower end to communicate with gates 68 provided in the drag mold. These gates join the casting by sprues 69 extending at intervals therefrom. The usual strainer cores 68ª are provided at the ends of the gates through which the iron passes. To facilitate pouring the iron the riser 67 extends horizontally at 67ª in the cope mold and thence upwardly at 67ᵇ near one corner of the flask. Inasmuch as the flask is quite large it is desirable to have the pouring opening near one corner or one edge where it is more accessible.

By use of this invention as described the molding of the complicated cylinder block casting is greatly simplified and cheapened. It will be seen that the mold comprises the four major parts and in addition a comparatively very few dry sand cores. Many parts of the mold, especially the cylinder barrel cores and the tappet chamber cores, may be made of green sand by this invention where heretofore it was necessary to use dry sand cores. The formation of the separate parts of the mold of green sand by use of the patterns constructed as described, is much more simple than has heretofore been done.

When the mold is assembled the inner part of the tappet chamber mold is supported by projections 70 on its under surface which engage like projections 71 on the upper surface of the drag mold, these projections serving as cores to form the holes 14 in the bottom of tapped chamber. The lower ends of the barrel cores engage and are supported by the top of the drag mold and these barrel cores are also strengthened by the vent pipes 53 which extend through them.

The patterns are accurately made and the flasks are positioned relative to each other by the usual guide pins so that when assembled the mold is very accurate as to measurement and fit and the resulting casting is very nearly perfect in dimensions.

In a foundry where a large production of a single type of casting is made the saving by the use of this invention is very large, this saving including not only the saving of materials by substituting the green sand cores as much as possible by the dry sand cores, as previously described, but the molds may be made much more rapidly and consequently a much larger production may be had resulting in a saving in labor and general overhead expenses.

I claim:

1. A mold for castings comprising a drag portion, a cheek portion having a lateral recess extending through a vertical side thereof, a portion adapted to be inserted in said lateral recess to fill the same and extending into the mold cavity, and a cope portion.

2. A mold for castings formed of green sand having a recess in a vertical side thereof, a flask for the same having a corresponding recess in a vertical side thereof, and an arbor plate detachably mounted in said recess in the flask and having a portion of the mold formed thereon and extending into said recess in the mold.

3. A mold for castings formed of green sand having a recess in a vertical side thereof, a flask for the same having a corresponding recess in a vertical side thereof, an arbor plate to be detachably located in the said recess in the vertical side of the flask and a green sand core formed on the said arbor plate and extending into said recess in the mold and supported by said mold at its inner end.

4. A mold for cylinder block castings comprising a drag portion to form the under and inner sides of the lower part of the casting, a cheek mold to form the outer sides of the major portion of the casting, said cheek mold having a recess in one side thereof, a tappet chamber core made of green sand located in said recess in said cheek mold, and a cope mold having depending green sand cores to form the cylinders of said casting.

5. A mold for cylinder block castings comprising a drag portion to form the under and inner sides of the lower part of the casting, a cheek mold to form the outer sides of the major portion of the casting, said cheek mold having a recess in one side thereof, a tappet chamber core made of green sand located in said recess in said cheek mold, and a cope mold having depending green sand cores to form the cylinders of said casting, said depending cores engaging and supported by said drag mold.

6. A mold for cylinder block castings comprising a drag portion to form the under and inner sides of the lower part of the casting, a cheek mold to form the outer sides of the major portion of the casting, said cheek mold having a recess in one side thereof, a tappet chamber core made of green sand located in said recess in said cheek mold, a cope mold having depending green sand cores to form the cylinders of said casting, and vent pipes embedded in said depending cores to strengthen and vent the same.

7. A mold for cylinder block castings comprising a drag portion to form the under and inner sides of the lower part of the casting, a cheek mold to form the outer sides of the major portion of the casting, said cheek mold having a recess in one side thereof, a tappet chamber core made of green sand located in said recess in said cheek mold, a cope mold having depending green sand cores to form the cylinders of said casting, said depending cores engaging and supported by said drag mold, and vent pipes embedded in said cores to strengthen and vent the same.

8. A mold for cylinder block castings comprising a drag portion to form the under and inner sides of the lower portion of the casting, a cheek portion to form the outer sides of the major portion of the casting, said cheek portion having a recess therein, a tappet chamber core made of green sand located in the said recess in the cheek portion, projections near the inner end of said tappet chamber core engaging the drag portion, and a cope portion having depending cores made of green sand to form the cylinders.

9. A mold for cylinder block castings comprising a drag portion, a cheek portion having a lateral recess in a vertical side in its upper surface, a tappet chamber core made of green sand located within said lateral recess, dry sand cores supported by said cheek portion and said tappet chamber core, and a cope portion.

10. A mold for cylinder block castings comprising a drag portion, a cheek portion having a lateral recess in a vertical side open at its upper surface, a tappet chamber core made of green sand located within said lateral recess, dry sand cores supported by said cheek portion and said tappet chamber core, and a cope portion having depending green sand cores engaging and supported by said drag portion.

11. A mold for castings having a recess and surrounded by a flask having a corresponding recess, an arbor plate detachably located in said recess in the flask, supporting members extending from said arbor plate, and a green sand core formed about said supporting members and supported thereby and located within the said recess in the mold.

12. A mold for castings having a recess and surrounded by a flask having a corresponding recess, an arbor plate detachably located in said recess in the flask, supporting members extending from said arbor plate, and a green sand core formed about said supporting members and supported thereby and located within the said recess in the mold, said core engaging with said mold near its inner edge whereby it is supported.

In testimony whereof I affix my signature.

DONALD J. CAMPBELL.